United States Patent [19]

Riley et al.

[11] Patent Number: 5,008,860
[45] Date of Patent: Apr. 16, 1991

[54] POSITION AND VELOCITY MEASURING SYSTEM

[75] Inventors: Thomas P. Riley, Westport, Mass.; Martin Buffman, Little Compton, R.I.; Reginald J. Cyr, Santa Barbara, Calif.

[73] Assignee: United States of America, Washington, D.C.

[21] Appl. No.: 336,452

[22] Filed: Mar. 16, 1989

[51] Int. Cl.⁵ .............................................. H04B 1/59
[52] U.S. Cl. ........................................................ 367/6
[58] Field of Search ........................................ 367/2-6, 367/127, 89

[56] References Cited

U.S. PATENT DOCUMENTS 4,176,338 11/1979 Spindel et al. ............................ 367/6
4,214,314 7/1980 Spiess et al. ............................. 367/2

Primary Examiner—Daniel T. Pihulic
Attorney, Agent, or Firm—Robert M. Wohlfarth; John P. Tarlano

[57] ABSTRACT

A position and velocity determining system, that uses two functioned receiver-transmitters. In performing a first function, each receiver-transmitter transmits an acoustic pulse at a unique frequency, in response to a first received accoustic pulse. In performing a second function, each receiver-transmitter transmits a continuous acoustic signal at a unique frequency, in response to a second received acoustic pulse.

1 Claim, 4 Drawing Sheets

POSITION AND VELOCITY MEASURING SYSTEM

BACKGROUND OF THE INVENTION

One aspect of the present invention involves sending out a pulse and waiting for another pulse to return. The time delay between the two pulses is an indication of the distance from the transmitting source to the receiving source. The uniqueness of this aspect is that acoustic pulses are sent out and acoustic pulses are received. An acoustic transmitter-receiver and an acoustic receiver-transmitter assembly are used. The acoustic receiver-transmitter assembly is under the direction of the acoustic transmitter-receiver. Immediate response by the acoustic receiver-transmitter assembly in the direction of the acoustic transmitter-receiver is important and allows one to obtain an accurate measure of distance. This distance information is obtained by measuring the turn around time between transmission of a pulse and receipt of a pulse by the transmitter-receiver.

A second aspect involves is the us of the receiver-transmitter assembly at the bottom of the ocean that sends out a continuous signal. The receiver-transmitter assembly is turned on as a result of a signal from the transmitter-receiver. A signal of a continuing duration and of a precise fixed frequency is sent out in all directions by the receiver-transmitter assembly. The transmitter-receiver may be on board a vehicle such as a submarine. The transmitter-receiver detects the fixed frequency signal. The transmitter-receiver measures the apparent frequency of the fixed frequency signal. The vehicle also knows the true frequency of the fixed frequency signal that is being sent out by the receiver-transmitter. An amount of difference in frequency, between the apparent frequency detected by the vehicle and the true fixed frequency, is an indication of an amount of velocity of the vehicle with respect to the receiver-transmitter assembly. The amount of shift in frequency is an indication of the velocity of the vehicle.

A third aspect of the invention is the use of a receiver-transmitter assembly at the bottom of the ocean to carry out the two above described functions. One function is immediate response by means of a pulse in response to receipt of a transmit pulse. Another function is response by means of a continuous fixed frequency signal in response to a receipt of a command signal.

A fourth aspect of the invention is a system that uses several bottom receiver-transmitter assemblies and thereby provides both position and velocity information to a vehicle. The position information is the result of the fact that the locations of several bottom receiver-transmitter assemblies are known with respect to the earth and that the distances from the vehicle to these bottom receiver-transmitter assemblies can be calculated. The velocity determination is due to the fact that the locations of several bottom receiver-transmitter assemblies are known with respect of the earth, and the position of the vehicle and velocities of the vehicle, with respect to these bottom receiver-transmitter assemblies, can be calculated.

Patent application Ser. No. 281,139, filed Dec. 7, 1988 shows a two functioned receiver-transmitter. The receiver-transmitter responds differently to two different input signals. A first response is a pulse. A second response is a continuous signal.

DESCRIPTION OF THE PREFERRED EMBODIMENT

Figure 1:
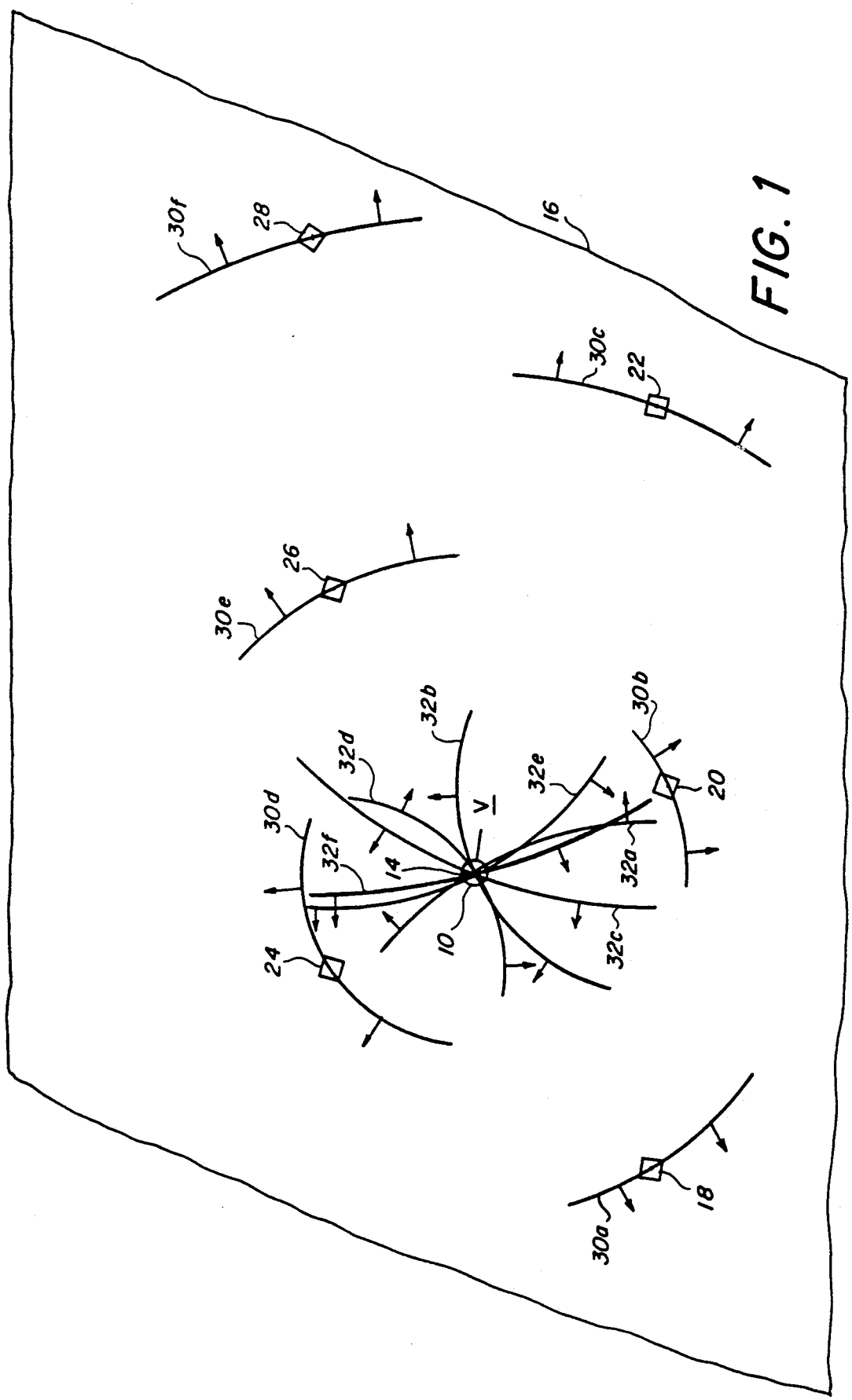
FIG. 1 is a perspective view of the disclosed system as used in a position determining mode.

FIG. 1 shows a vehicle 10 traveling below the surface of the sea. The vehicle could alternately be traveling on the surface of the sea.

The vehicle 10 carries a single transmitter-receiver 14. The vehicle 10 is moving relative to an area 16 of the floor of the sea. The vehicle 10 is above a field of receiver-transmitter assemblies 18, 20, 22, 24, 26, 28. The receiver-transmitter assemblies are anchored to the floor of the sea. They are located in the area 16 of the floor of the sea. The locations of these receiver-transmitter assemblies, relative to the earth, are known to the vehicle 10.

Fixed response frequencies of the receiver-transmitter assemblies differ among the different receiver-transmitter assemblies. The response frequency that is assigned to each receiver-transmitter is known to the vehicle 10. The fixed response frequency of a receiver-transmitter is unique to that particular receiver-transmitter.

An interrogate pulse 30 (itself not shown although portions are shown) is sent out from the transmitter-receiver 14. A portion 30a of the pulse 30 is received by receiver-transmitter assembly 18. A portion 30b of pulse 30 is received by receiver-transmitter assembly 20. Portions 30c, 30d, 30e and 30f of the pulse 30 are received by receiver-transmitter assemblies 22, 24, 26, and 28 respectively. Upon receipt of portion 30a, receiver-transmitter assembly 18 immediately responses by transmitting pulse 32a at a first frequency. Upon receipt of portion 30d, receiver-transmitter assembly 24 immediately responses by transmitting pulse 32d at a fourth frequency. Thereafter, receiver-transmitter assemblies 20 and 26 immediately respond to portions 30b and 30e by transmitting pulses 32b and 32e respectively. Pulse 32b is at a second frequency and pulse 32e is at a fifth frequency. Finally, receiver-transmitter assemblies 22 and 28 immediately respond to portions 30c and 30f by transmitting pulses 32c and 32f respectively. Pulse 32c is at a third frequency and pulse 32f is at a sixth frequency. The receiver-transmitter assemblies thus respond on frequencies that are different from each other.

The time between transmission of the interrogate pulse 30 by transmitter-receiver 14 and the times of receipt of the pulses 32a, 32b, 32c, 32d, 32e and 32f by transmitter-receiver 14 are detected. In the example, the six delta t values are 21.2 seconds, 26 seconds, 48.5 seconds, 18.0 seconds, 23.6 seconds and 47.36 seconds. These six times are used in a formula $D=(\frac{1}{2})(C)(\text{delta } t)$. D is the distance between the transmitter-receiver 14 and a receiver-transmitter assembly, such as receiver-transmitter assembly 18. The value C is the velocity of sound in sea water. This value is taken as 8,800 inches per second or 500 miles per hour. The term delta t is the difference in time between transmission of the interrogate pulse 30 by transmitter-receiver 14 and receipt of a pulse, such as pulse 32a, by transmitter-receiver 14. The distance D between the vehicle 10 and a receiver-transmitter assembly, such as receiver-transmitter assembly 18, can therefore be calculated using the above formula. In the example the six distance values D1, D2, D3, D4, D5 and D6 are 7774 feet, 9544 feet, 17,786 feet, 6665 feet, 8646 feet and 17,364 feet.

After distances D1, D2, D3, D4, D5 and D6 from vehicle 10 to the receiver-transmitter assemblies 18, 20, 22, 24, 26, and 28, respectively, are calculated, the distances are modified for height of the vehicle 10 above the field of receiver-transmitters. These modified distances result in horizontal distances H. Horizontal distances H may be used to determine the position of the vehicle 10 with respect to the receiver-transmitter assembly field and to determine the position of the vehicle 10 on the earth.

Figure 2:
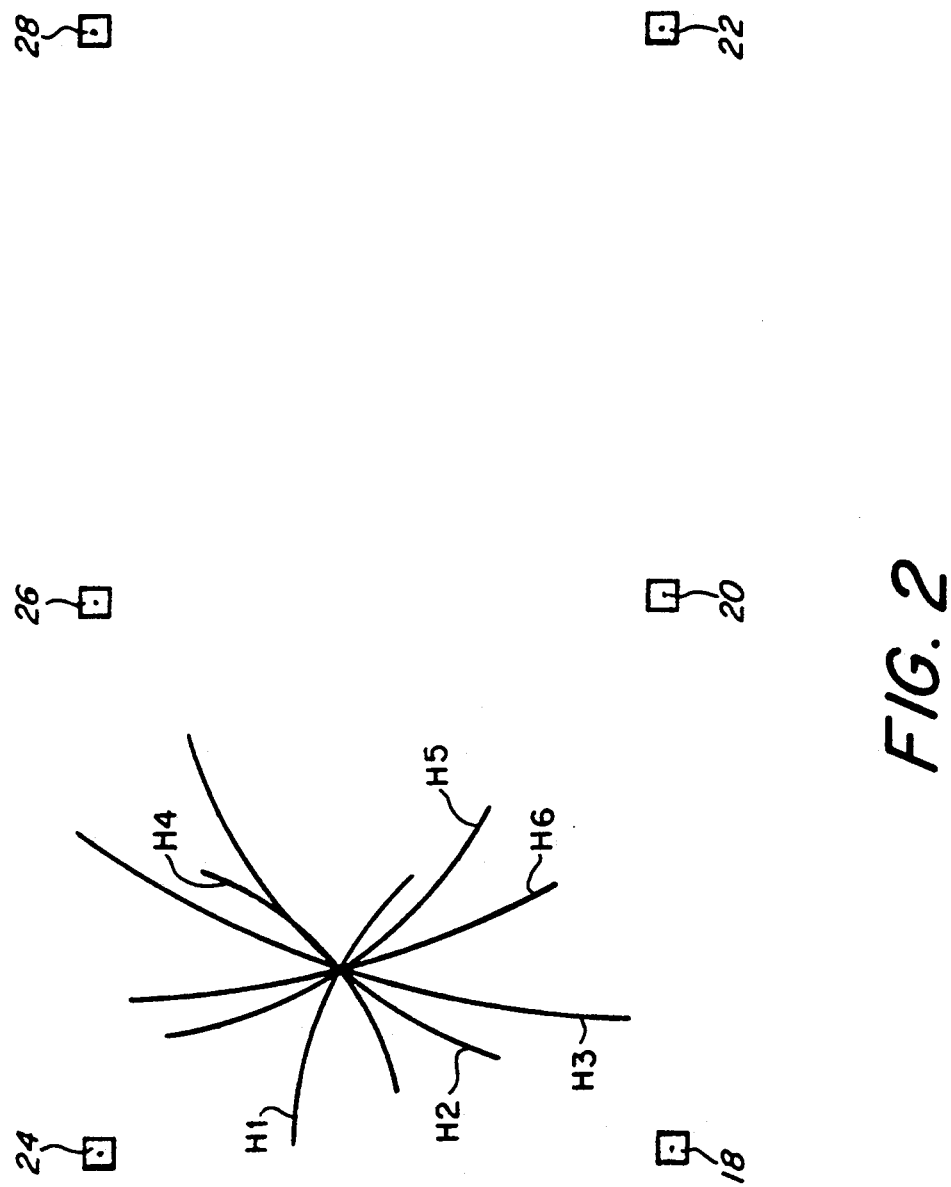
FIG. 2 is a diagram of a method of plotting the location of a vehicle by using the information gathered with the mode shown in FIG. 1.

FIG. 2 is a diagram of the position of vehicle 10 with respect to the field of receive-transmitter assemblies. In a first example the vehicle 10 would be known to be a vertical distance S of 4000 feet above the surface of the sea.

The horizontal distances H, from vehicle 10 to the receiver transmitter assemblies, are shown in FIG. 2. These horizontal distances, are calculated using a formula H=square-root of the quantity (D squared−S squared). Using this latter formula H1 through H6 are 6666 feet, 8665 feet, 17,331 feet, 5332 feet, 7665 feet and 16,898 feet. In FIG. 2 the receiver-transmitters are set in a rectangular pattern. They are 10,000 feet apart. They lie in an east-west pattern.

The receiver-transmitter 18 is known to be at 43 degree, 10 minutes and 15 seconds, north lattitude and at 66, 20 minutes, 25 seconds, west longitude. Therefore the exact position relative to the earth is known. The position of receiver-transmitter 18 may be plotted on a map. The positions of the other receiver-transmitters may also be plotted by measuring away from the plot of receiver-transmitter 18, given the information above.

Figure 3:
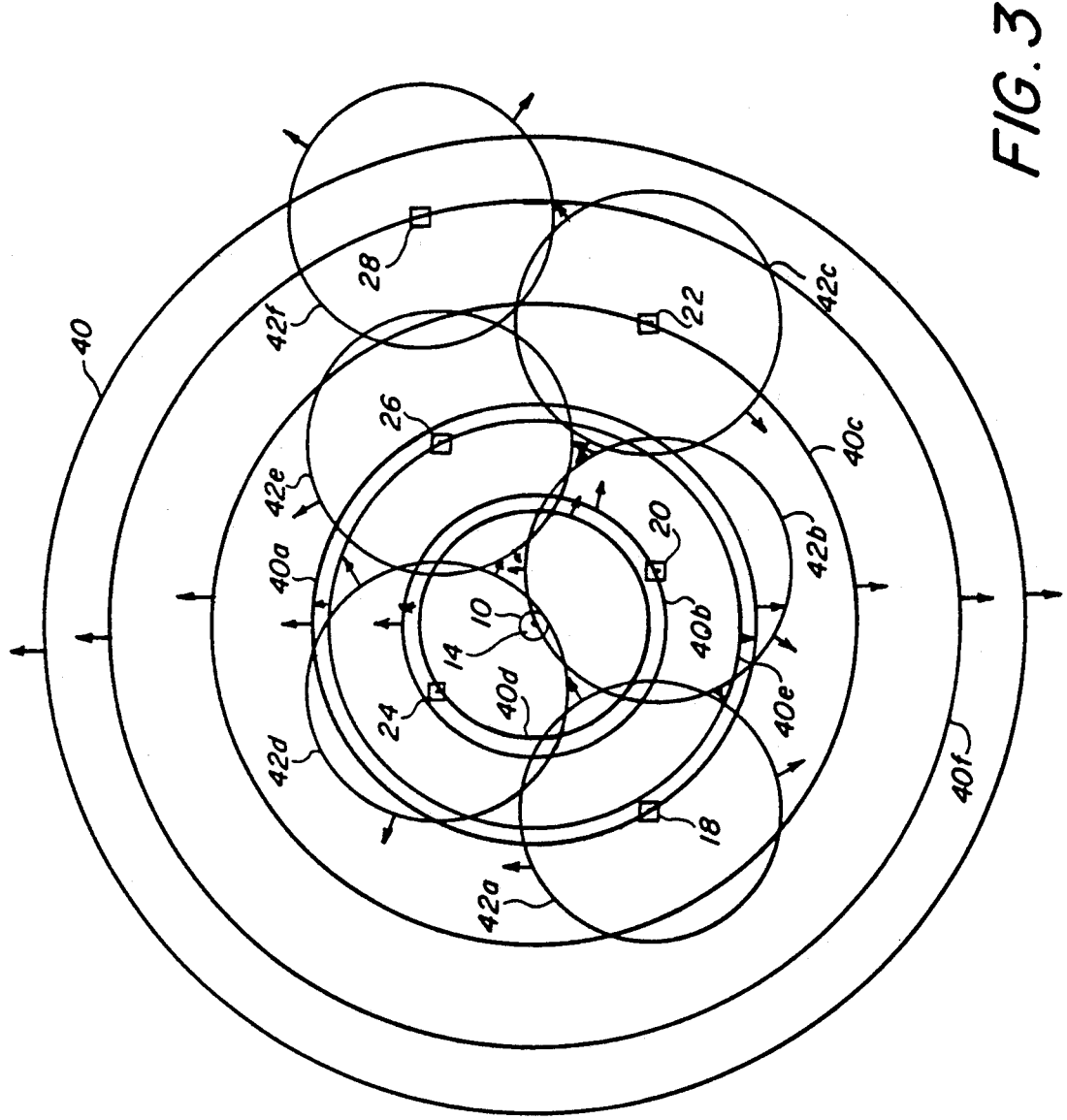
FIG. 3 is a perspective view of the disclosed system as used in a velocity determining mode.

FIG. 3 shows the position and velocity measuring system in the velocity measuring mode. A signal 40 is sent out of transmitter-receiver 14 on board vehicle 10. The signal 40 advances. Portions 40a, 40b, 40c, 40d, 40e and 40f of signal 40 turn on the receiver-transmitter assemblies 18, 20, 22, 24, 26 and 28 respectively, as the portions are received by the receiver-transmitters. There is an instruction in signal 40 for each receiver-transmitter assembly to continuously transmit a signal at a known fixed output frequency and for an extended period of time, such as five minutes. Such response signals are designated 42a, 42b, 42c, 42d, 42e and 42f. The frequencies transmitted by the receive-transmitter assemblies are different from one another. The true output frequency of a receiver-transmitter is unique to that particular receiver-transmitter. The true fixed output frequency assigned to each receiver-transmitter is known to vehicle 10. The true output frequencies of the receiver-transmitter assemblies 18, 20, 22, 24, 26 and 28 are designated as f1, f2, f3, f4, f5, and f6 respectively.

Again, FIG. 3 shows fixed output frequency signals 42a, 42b, 42c, 42d, 42e and 42f that are continuously transmitted by the six receiver-transmitter assemblies 18, 20, 22, 24, 26 and 28. The apparent frequencies f7, f8, f9, f10, f11 and f12, at vehicle 10, of these six signals 42a, 42b, 42c, 42d, 42e, and 42f are detected. The difference between the true fixed frequencies f1, f2, f3, f4, f5 and f6 of the signals 42a, 42b, 42c, 42d, 42e and 42f from receiver-transmitter assemblies 18, 20, 22, 24, 26 and 28 respectively and the measured apparent frequencies f7, f8, f9, f10, f11 and f12 of these signals at vehicle 10 are used in determining the velocity of vehicle 10.

In the example, the known frequencies f1, f2, f3, f4, f5, and f6 of signals 42a, 42b, 42c, 42d, 42e and 42f are 1000, 1500, 2000, 2500, 3000 and 3500 cycles per second respectively.

In the example, the apparent frequency f7 of signal 42a is measured at vehicle 10 as 990.6 cycles per second. The other apparent frequencies f8, f9, f10, f11 and f12 are measured at body 10 as 1523, 2038, 2468, 3048 and 3567 cycles per second, respectively. The velocity of vehicle 10 with respect to the receiver-transmitter field may be calculated by using the formulas:

$V1 = (C)(f1-f7)/f1$
$V2 = (C)(f2-f8)/f2$
$V3 = (C)(f3-f9)/f3$
$V4 = (C)(f4-f10)/f4$
$V5 = (C)(f5-f11)/f5$
$V6 = (C)(f6-f12)/f6$

C is the velocity of sound in sea water, namely 500 miles per hour. V1, V2, V3, V4, V5, and V6 are the calculated velocities of vehicle 10 with respect to receiver-transmitter assemblies 18, 20, 22, 24, 26, and 28 respectively.

In the example, the velocities V1 and V4 are calculated to be 4.70 miles per hour and 6.43 miles per hour, respectively, for body 10, away from receiver-transmitter assemblies 18 and 24. The velocities V2 and V5 are calculated to be 7.88 miles per hour and 8.00 miles per hour respectively, for vehicle 10, toward receiver-transmitter assemblies 20 and 26. The velocities V3 and V6 are calculated to be 9.56 miles per hour and 9.52 miles per hour respectively, for vehicle 10, toward receiver-transmitter assemblies 22 and 28.

Figure 4:
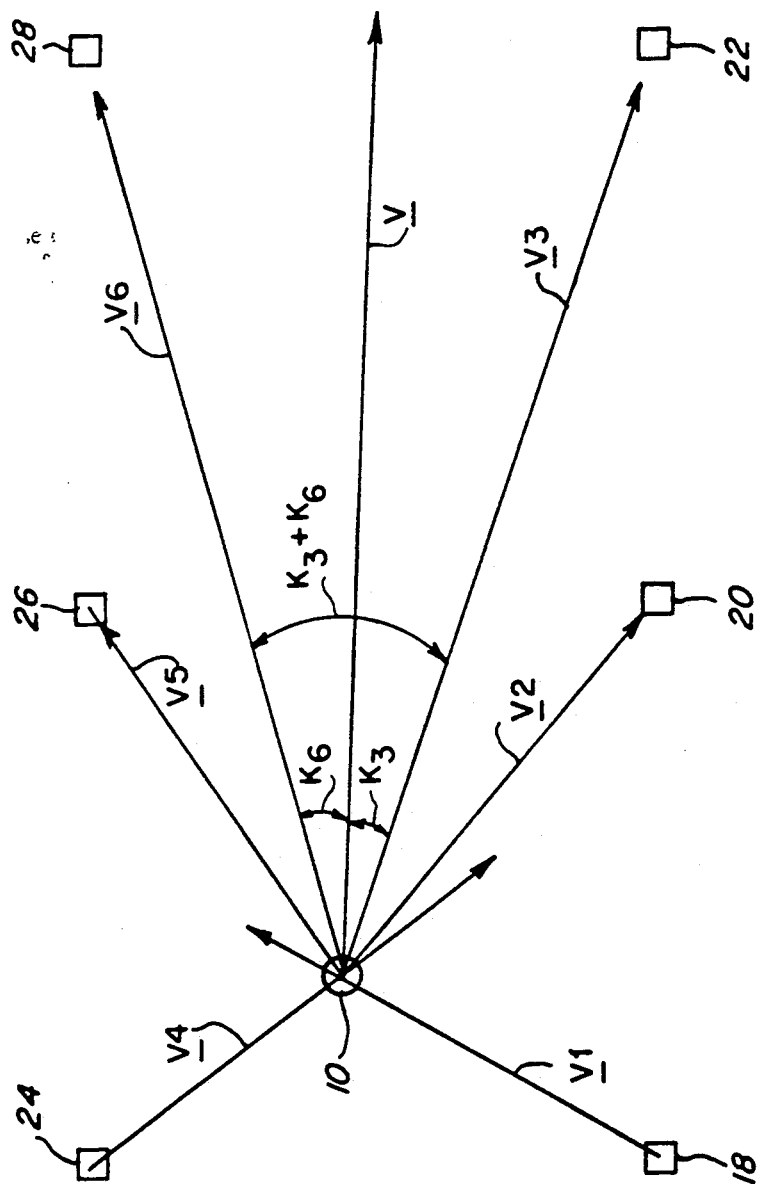
FIG. 4 is a diagram of a method of determining the velocity and direction of a vehicle by using the information gathered with the mode shown in FIG. 3 and the information gathered with the mode shown in FIG. 1.

FIG. 4 is a diagram used for determining the velocity vector $\underline{V}$ of the vehicle 10 with respect to the earth. This diagram shows velocity vectors $\underline{V1}, \underline{V2}, \underline{V3}, \underline{V4}, \underline{V5}$ and $\underline{V6}$ of body 10. The vectors $\underline{V1}$ to $\underline{V6}$ have magnitudes equal to calculated velocities $V1$ to $V6$ respectively of vehicle 10. The directions of vectors $\underline{V1}$ to $\underline{V6}$ are the directions of movement of vehicle 10 with respect to the receiver-transmitters 18 to 28, respectively. The position of vehicle 10 with respect to each of the receiver-transmitters 18 to 28 is determined by the mode shown in FIG. 1.

The value V of velocity vector $\underline{V}$ of the vehicle 10 may be calculated. The angle K6 between velocity vector $\underline{V}$ of vehicle 10 and vector $\underline{V6}$ of the vehicle 10 may also be calculated. K6 is calculated by solving, for K6, the simultaneous equations $(V3)(\cos K3) = (V6)\cos(K6)$ and $K3+K6 =$ (measured value of combined angle K3 plus K6 from diagram of FIG. 4). K3 is an unknown angle between velocity vector $\underline{V}$ of vehicle 10 and vector $\underline{V3}$. With the value of velocity, V6, and calculated angle K6, the value of velocity V is calculated to be 10 miles per hour, using the formula $V = (V6)(\cos K6)$. The direction of vector $\underline{V}$ may be plotted since K6 has been calculated.

While the present invention has been disclosed in connection with the preferred embodiment thereof, it should be understood that there may be other embodiments which fall within the spirit and scope of the invention defined by the following claims.

What is claimed is:

1. A position and velocity determining system for a vehicle in an ocean, comprising;
   (a) first means located on a vehicle for transmitting either a first acoustic pulse or a second acoustic signal toward an area of an ocean floor;
   (b) a plurality of two functioned receiver-transmitters substantially fixed in known locations of said area, each having a first function for receiving the first acoustic pulse and for immediately responding by transmitting an acoustic pulse at a unique frequency that is known to the vehicle, and each having a second function for receiving the second acoustic signal and for transmitting an acoustic signal of a unique fixed frequency that is known to the vehicle, the latter transmissions continuing for at least several seconds;
   (c) third means located on the vehicle for receiving the acoustic pulses;
   (d) fourth means located on the vehicle for determining the time difference between the transmission of the first acoustic pulse and the reception of the acoustic pulses from the receiver-transmitter;
   (e) fifth means located on the vehicle for determining the positions of the vehicle relative to said known locations, based on said time differences;
   (f) sixth means located on the vehicle for receiving the acoustic signals from the receiver-transmitters;
   (g) seventh means located on the vehicle for determining the apparent frequencies of the acoustic signals received from the receiver-transmitters;
   (h) eighth means located on the vehicle for determining any differences in frequency between the apparent frequencies and the unique fixed frequencies of the acoustic signals received from the receiver-transmitters; and
   (i) ninth means located on the vehicle for determining the velocities of the vehicle relative to said locations, based on determined differences in frequency and said determined positions of the vehicle relative to said known locations.

* * * * *